(12) United States Patent
Buelow et al.

(10) Patent No.: US 8,657,476 B2
(45) Date of Patent: Feb. 25, 2014

(54) ELONGATED LED LIGHTING ARRANGEMENT

(75) Inventors: Roger F. Buelow, Pepper Pike, OH (US); Laszlo A. Takacs, Lakewood, OH (US); Blair L. Unger, Rochester, NY (US)

(73) Assignee: Energy Focus, Inc., Solon, OH (US)

( * ) Notice: Subject to any disclaimer, the term of this patent is extended or adjusted under 35 U.S.C. 154(b) by 171 days.

(21) Appl. No.: 13/335,503

(22) Filed: Dec. 22, 2011

(65) Prior Publication Data

US 2012/0163013 A1 Jun. 28, 2012

Related U.S. Application Data

(60) Provisional application No. 61/426,423, filed on Dec. 22, 2010.

(51) Int. Cl.
*F21V 33/00* (2006.01)

(52) U.S. Cl.
USPC ........... 362/555; 362/613; 362/608; 362/254; 362/223

(58) Field of Classification Search
USPC .................. 362/612, 613, 608, 555, 254, 223
See application file for complete search history.

(56) References Cited

U.S. PATENT DOCUMENTS

| | | | |
|---|---|---|---|
| 4,996,632 A | 2/1991 | Aikens | |
| 6,637,905 B1 | 10/2003 | Ng et al. | |
| 6,795,243 B1 | 9/2004 | McGettigan et al. | |
| 7,163,326 B2 | 1/2007 | Cassarly et al. | |
| 7,164,819 B2 | 1/2007 | Jenson et al. | |
| 7,194,184 B2 | 3/2007 | Buelow, II et al. | |
| 7,234,820 B2 | 6/2007 | Harbers et al. | |
| 7,330,632 B1 | 2/2008 | Buelow, II et al. | |
| 7,478,936 B2 * | 1/2009 | Chen | 362/555 |
| 7,513,669 B2 | 4/2009 | Chua et al. | |
| 7,543,959 B2 | 6/2009 | Bierhuizen et al. | |
| 7,549,783 B2 | 6/2009 | Cassarly et al. | |
| 7,709,811 B2 | 5/2010 | Conner | |

(Continued)

FOREIGN PATENT DOCUMENTS

WO 2006035388 A2 4/2006

OTHER PUBLICATIONS

Cree, Inc., Cree XLamp XT-E LEDs, Product Family Data Sheet, 2011-2012, Cree Inc., Durham, NC, USA.

(Continued)

*Primary Examiner* — Laura Tso
(74) *Attorney, Agent, or Firm* — Bruzga & Associates; Charles E. Bruzga

(57) ABSTRACT

An elongated LED lighting arrangement comprises an elongated light pipe with homogeneous optical material between first and second ends. In an exemplary embodiment, an LED provides blue light to the light pipe via a first dichroic mirror tuned to pass blue light. Down-converting means on sidewall of the light pipe, tuned to receive blue light, absorbs blue light from the LED and to emit lower-energy light outside of the light pipe at respectively higher wavelengths. Light-extracting means on the sidewall extract from the light pipe some blue light without changing the wavelengths of the foregoing light. Light from the down-converting means and the light-extracting means are combined to provide a composite color. The first dichroic mirror receives some light emitted by the down-converting means and reflects back into the light pipe more than 80 percent of the light received by the mirror.

19 Claims, 6 Drawing Sheets

(56) References Cited

U.S. PATENT DOCUMENTS

| | | |
|---|---|---|
| 7,744,241 B2 | 6/2010 | Xu |
| 7,976,204 B2 | 7/2011 | Li et al. |
| 8,002,448 B2 | 8/2011 | Chen |
| 8,004,172 B2 | 8/2011 | Hussel et al. |
| 2005/0270775 A1 | 12/2005 | Harbers et al. |
| 2006/0227302 A1 | 10/2006 | Harbers et al. |
| 2007/0263405 A1 | 11/2007 | Ng et al. |
| 2007/0291491 A1 | 12/2007 | Li et al. |
| 2007/0291505 A1 | 12/2007 | Fortenberry et al. |
| 2007/0297061 A1 | 12/2007 | Kyomoto et al. |
| 2008/0158873 A1 | 7/2008 | Bierhuizen et al. |
| 2009/0244922 A1 | 10/2009 | Hayakawa et al. |
| 2010/0008101 A1 | 1/2010 | Bucher |
| 2010/0165621 A1 | 7/2010 | Hoffend, Jr. et al. |
| 2010/0188867 A1 | 7/2010 | Li |
| 2010/0275999 A1 | 11/2010 | Buelow, II |
| 2010/0296312 A1 | 11/2010 | Van Gorkom et al. |

OTHER PUBLICATIONS

Cree, Inc., Cree XLamp XT-E Royal Blue LEDs, Product Family Data Sheet, 2011, Cree Inc., Durham, NC, USA.

Intematix, NYAG4653 Datasheet, 2012, Intematix, Fremont, CA, USA.

* cited by examiner

ELONGATED LED LIGHTING ARRANGEMENT

FIELD OF THE INVENTION

The present invention relates to an elongated LED lighting arrangement comprising various light wavelength-tuned components for increasing efficiency.

BACKGROUND OF THE INVENTION

Various elongated LED lighting arrangements for general illumination have been proposed in the prior art. Many of such arrangements suffer from low efficiency in conversion of electricity to light, and also suffer from producing light with a color temperature that may be less than pleasing to many viewers.

It would be desirable to provide elongated LED lighting arrangements whose efficiency in converting electricity to useful light is enhanced, and having a light output whose color temperature can be more aesthetically pleasing, such as by exhibiting a warmer color temperature light.

BRIEF SUMMARY OF THE INVENTION

In a preferred form, an elongated LED lighting arrangement comprises an elongated light pipe extending between first and second ends. The light pipe has a sidewall between the ends facing outwardly of the light pipe. The light pipe comprises homogeneous optical material between the ends. A first LED light source comprises at least one LED tuned to efficiently provide to the light pipe, via the first end, light within a first wavelength band. A first dichroic mirror is interposed between the first LED light source and the first end. The mirror is tuned to pass more than 90 percent of light within the first wavelength band from the first LED light source into the light pipe via the first end. Down-converting means on the sidewall is tuned to efficiently absorb light rays from the first LED light source within a wavelength range that includes at least 80 percent of the first wavelength range and to emit lower-energy light rays outside of the light pipe at respectively higher wavelengths. Light-extracting means on the sidewall extract from the light pipe some light rays within the first wavelength band without changing the wavelengths of the foregoing light. The down-converting means and the light-extracting means are arranged so that the light emitted by the down-converting means and the light extracted from the light pipe by the light-extracting means intermix to produce light, the majority of which has a composite color determined by the foregoing light emitted and the foregoing light extracted. The first dichroic mirror receives some light emitted by the down-converting means and reflects back into the light pipe more than 80 percent of the light received by the mirror, so that the reflected light can be extracted from the side of the light pipe by the light-extracting means.

The foregoing elongated LED lighting arrangement beneficially has enhanced efficiency in converting electricity to useful light in comparison with many prior art arrangements, and also has a light output whose color temperature can be more aesthetically pleasing, such as by exhibiting a warmer color temperature light.

BRIEF DESCRIPTION OF THE DRAWINGS

Further features and advantages of the invention will become apparent from reading the following detailed description in conjunction with the following drawings, in which like reference numbers refer to like parts unless otherwise noted.

DETAILED DESCRIPTION OF THE PREFERRED EMBODIMENT

This description describes three preferred embodiments of elongated lighting arrangements, one having symmetrical ends and the other two having non-symmetrical ends.

Symmetrical Embodiment

Figure 1:
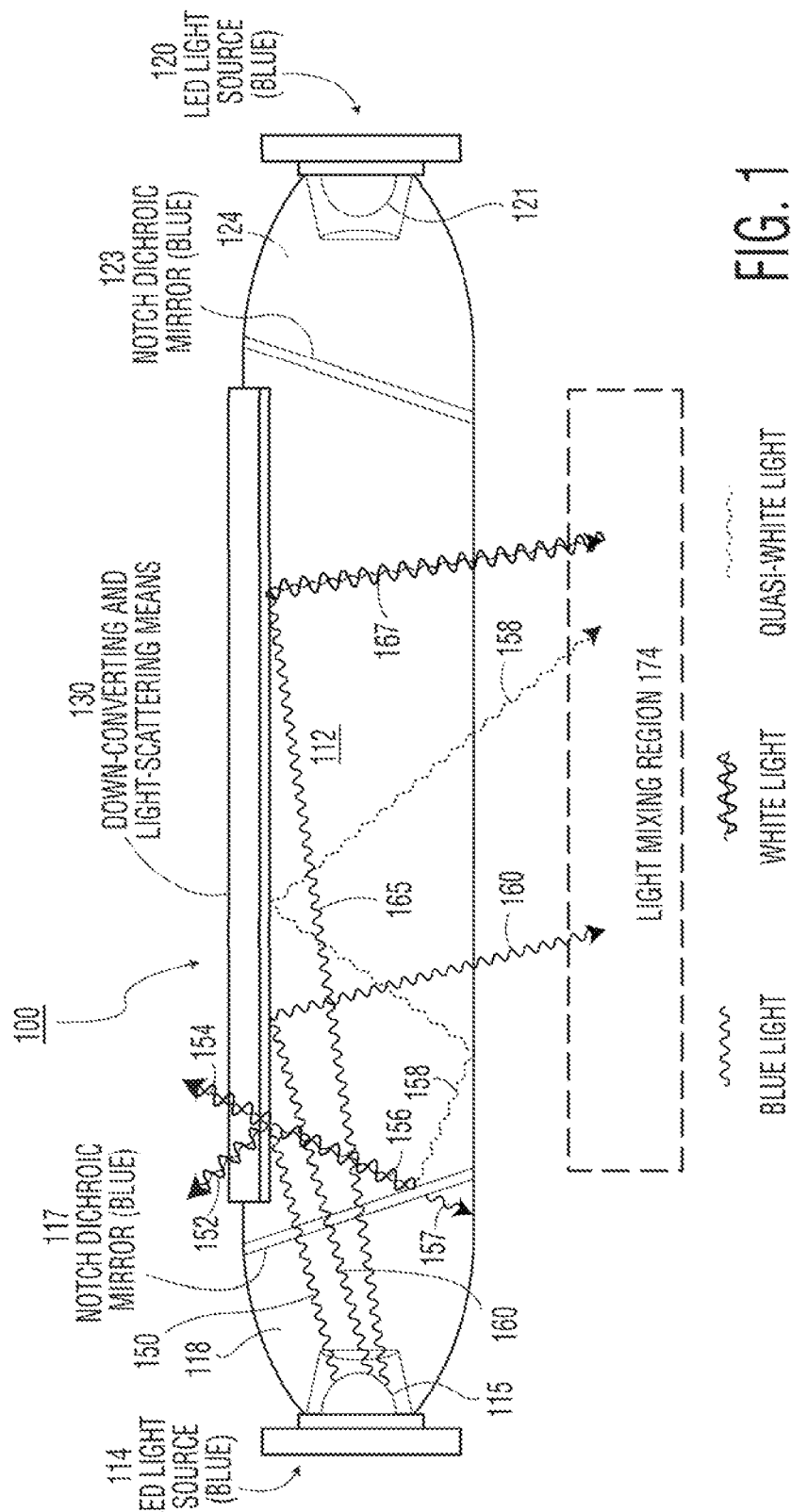
FIG. 1 is a side view of an elongated lighting arrangement in accordance with one embodiment of the invention.

FIG. 1 shows an elongated lighting arrangement 100 comprising a light pipe 112, which may comprise a cylindrical acrylic polymer rod, by way of example. Other details of suitable light pipes are described below. Light within a first wavelength range, preferably blue light, is provided to associated ends of light pipe 112 by light sources 114 and 120, each of which comprises one or more LEDs preferably tuned to blue light. Blue light LEDs are presently preferred, because such LEDs are highly efficient in converting electricity to light. By "tuned" is meant herein that the component in question is designed in a way so as to enhance or even optimize some aspect of the "object" which is tuned, whereby, for instance, tuning of LEDs to blue light means that the LEDs are designed so as to enhance or even optimize blue light emission.

LED light sources 114 and 120 each comprise one or more LEDs for producing blue light, typically with a common lens 115 and 121, respectively.

A notch dichroic mirror 117 is interposed between light source 114 and the left-shown end of light pipe 112, and a further notch dichroic mirror 123 is interposed between light source 120 and the right-shown end of light pipe 112. Each of notch dichroic mirrors 117 and 123 is tuned to pass more than 90 percent of light within the mentioned first wavelength range, and which preferably is for blue light. The mirrors 117 and 123 may be angled as shown to increase overall efficiency, but many other orientations and shapes, including multi-faceted shapes, will be routine to persons of ordinary skill in the art from the present specification.

Preferably interposed between LED light source 114 and notch dichroic mirror 117 is a light coupler 118. Light coupler 118 is configured to condition the angular distribution of light to promote total internal reflection of such light within the light pipe. A similar light coupler 124 is preferably interposed between LED light source 120 and notch dichroic mirror 123, and is also configured to condition the angular distribution of light to promote total internal reflection of such light within the light pipe Shown atop light pipe 112 is a down-converting and light-scattering means 130, whose cross section is shown in any of alternative FIG. 2, 3 or 4.

Figure 2:
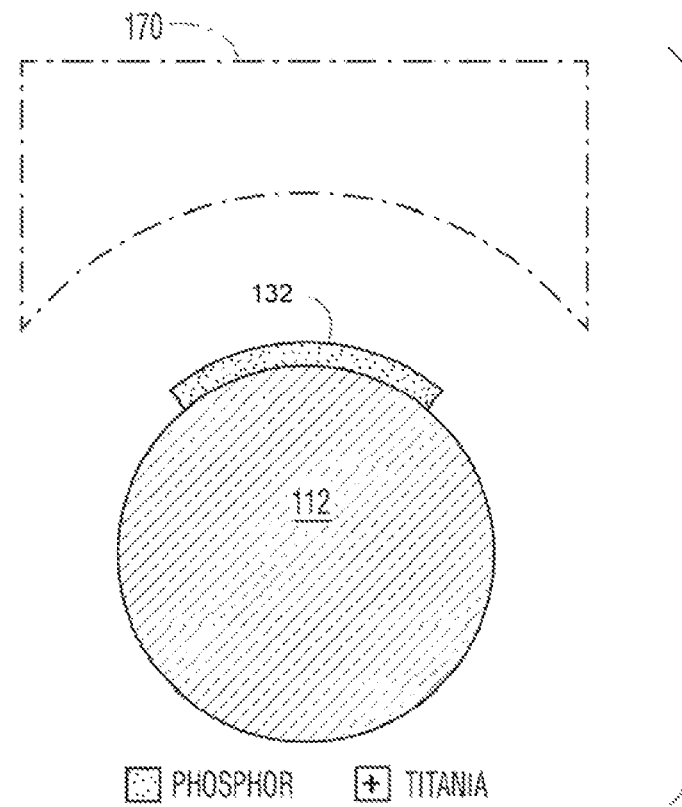
FIGS. 2, 3 and 4 are enlarged, alternative cross-sections of the lighting arrangement of FIG. 1 taken midway along the left-to-right axis of the elongated lighting arrangement shown in FIG. 1.
Figure 3:
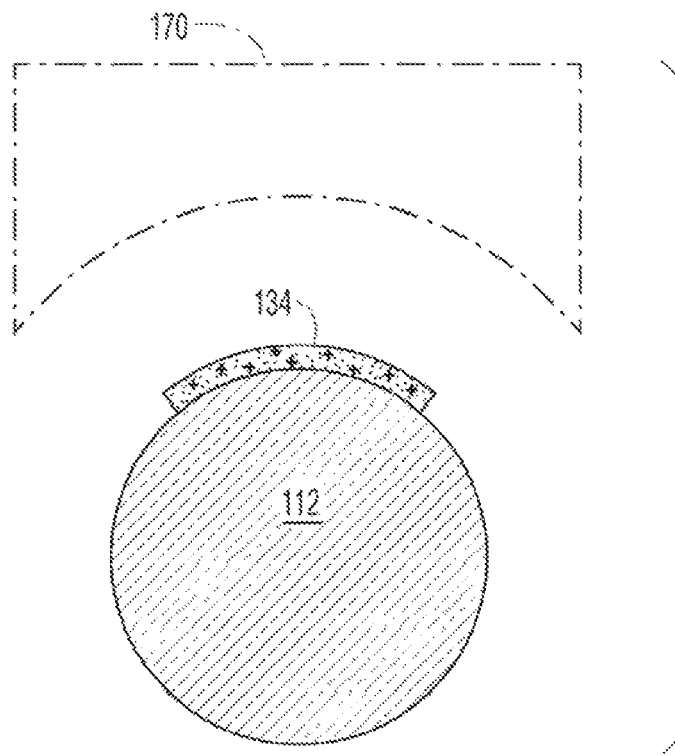
Figure 4:
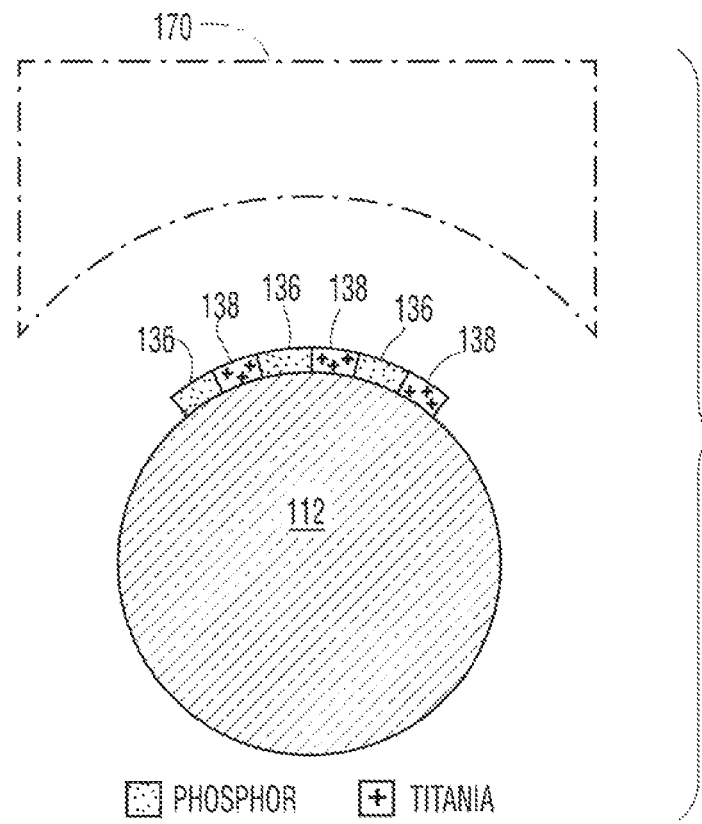

FIG. 2 shows down-converting and light-scattering means 130 of FIG. 1 as a phosphor layer 132, usually within a suitable binder, atop light pipe 112. Some material in the phosphor layer can absorb light at one wavelength and emit higher-wavelength light at a lower energy; hence, the term "down-converting" means as used herein. Some material in a phosphor layer that is applied to a light pipe can act as a light scatterer so as to extract light from the light pipe and emit it from a sidewall of the light pipe at the same wavelength. The term "light-scattering means" or variants are used herein to indicate the foregoing type of light extraction without changing the wavelength of light. Thus, the phosphor layer 132 acts as both a down-converting means and a light-scattering means.

Where a greater extent of extraction of light from the sidewall of light pipe 112 by a light-scattering means at the same wavelength is desired, the down-converting and light-scattering means 130 of FIG. 1 can also incorporate a more traditional light-scattering material. Thus, FIGS. 3 and 4 show the incorporation of titania, as indicated by the small x-shaped particles to contrast with dots used to portray phosphor. FIG. 3 shows titania and phosphor intermixed in down-converting and light-scattering means 134, whereas FIG. 4 shows one example of stripes 136 of phosphor and interspersed stripes 138 of titania, which would each have a suitable binder, and could be oriented in other directions than along the main path of light propagation from end to end of light pipe 112.

Other forms of down-converting means, such as quantum dots or dyes can be used instead of phosphor, and other forms of light-scattering means can be used instead of titania as will be further described below.

FIG. 1 shows two exemplary blue light rays 150 and 160, which are shown with short wavelength sinusoidal waveforms, for explaining the operation of elongated lighting arrangement 100.

Exemplary upper blue light ray 150 emitted by light source 114 strikes down-converting and light-scattering means 130 at the top of light pipe 112, and causes one of several alternative light rays 152, 154 and 156 to emerge. These light rays 152, 154 and 156 are alternative light rays resulting from absorption of blue light ray 150 by the down-converting aspect of down-converting and light-scattering means 130, which is tuned to receive blue "excitation" light and emit light at higher wavelengths. Since the wavelengths of emission from the foregoing down-converting means will vary, the result to the viewer is preferably white light or another broad wavelength spectrum light. Accordingly, exemplary white light rays 152, 154 and 156 are shown as a composite of two different frequencies as an indication of a broad wavelength spectrum of light rays, although white light actually comprises many more than two wavelengths of light. The white light rays 152, 154 and 156, emitted from the foregoing down-converting means typically radiate in all directions, but only a few exemplary directions are shown.

Since exemplary white light rays 152 and 154 are directed upwardly, in similar manner as white light is radiated from a conventional fluorescent lamp tube, it is desirable to capture the upwardly directed light. Accordingly, as shown in FIGS. 2-4, a typically non-specular reflector 170 can capture and redirect light back downwardly.

In FIG. 1, white light ray 156 is randomly directed downwardly from the mentioned down-converting means and strikes the notch dichroic mirror 117, tuned to pass light in the blue wavelength range. Accordingly, a component of white light ray 156 in the blue light wavelength range passes through dichroic mirror 117 as blue light ray 157, and typically is lost because it does not contribute to side-light extraction from elongated lighting arrangement 100. However, higher wavelength light 158, referred to herein as "quasi-white light," is saved and converted to useful light by being reflected from notch dichroic mirror 117. Quasi-white light ray 158 is then totally internally reflected from the bottom sidewall of the light pipe 112 in a direction from left to right. The totally internally reflected quasi-white light ray 158 then reaches the down-converting and light-scattering means 130. The down-converting aspect of such means 130 is not tuned to quasi-white light ray 158, which is at higher wavelength than blue light, but rather is tuned to blue light as mentioned above, and so the light-scattering aspect of means 130 scatters light ray 158 in a downward direction.

A light mixing region 174, shown beneath light pipe 112 signifies that light of various colors is mixed together, such as quasi-white light ray 158, blue light ray 162 and white light ray 167. Light rays 158, 162 and 167 do not totally internally reflect within light pipe 112, due to their high angle with respect to a main path of light propagation through the light pipe between the left- and right-shown ends of such light pipe. However, mixing of light of various colors occurs in other places as well, including within light pipe 112 and also as a result of typically white light being reflected downwardly from the reflector 170 shown in FIGS. 2-4. Preferably, the composite color of resulting light is white with a color temperature between 2700 K and 4500 K, and more preferably, with a color temperature between 2700 K and 3500 K.

In FIG. 1, the second blue light ray 160 strikes the down-converting and light-scattering means 130 at the top of light pipe 112, whereupon the light-scattering aspect of such means 130 scatters light ray 160 downwardly.

FIG. 1 further shows LED light source 114 emitting a blue light ray 165 that reaches and is absorbed by the down-converting aspect of the down-converting and light-scattering means 130 at the top of light pipe 112. As a consequence, the down-converting and light-scattering means 130 emits white light ray 167, which is randomly directed downwardly to enter light mixing region 174.

Typically, the right- and left-shown halves of elongated lighting arrangement 110 of FIG. 1 are symmetrical to each other, Therefore, the interaction of blue light from LED light source 120 with down-converting and light-scattering means 130 is the same as the interaction of blue light from LED light source 114 with such means 130.

Tuning of LEDs, Notch Dichroic Mirror and Down-Converting Means

In conformity with the above definition of "tuned," the word "tuning" means herein that a component in question is designed in a way so as to enhance or even optimize some aspect of the "object" which is tuned, whereby, for instance, tuning of LEDs to blue light means that the LEDs are designed so as to enhance or even optimize blue light emission. Such designing (or tuning) is done before manufacturing a component. More description is now provided for of tuning components such as the LEDs used in light sources 114 and 120, the notch dichroic mirrors, 117 and 123 and the down-converting aspect of the down-converting and light-scattering means 130.

Figure 5:
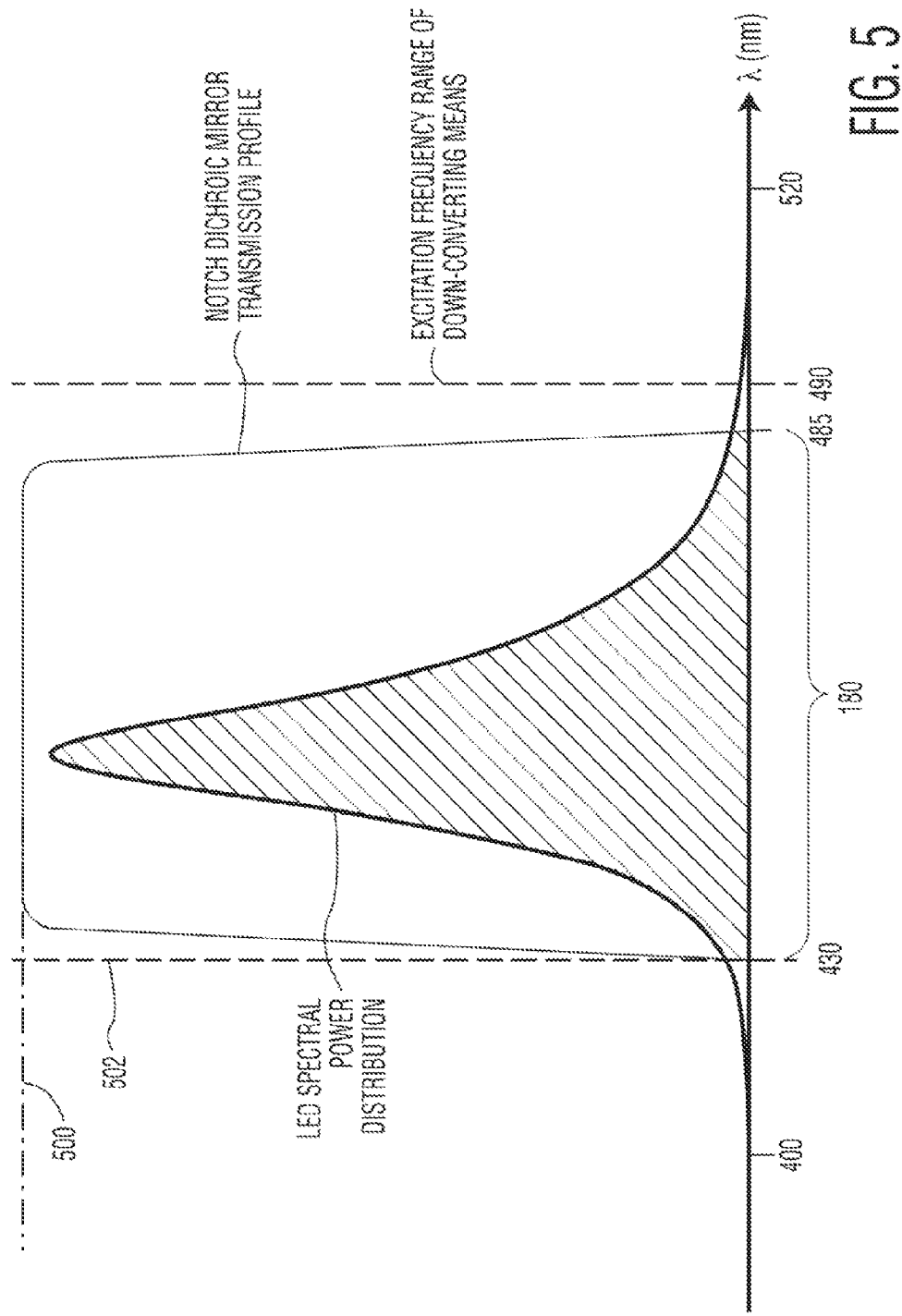
FIG. 5 shows in graph form preferred wavelength characteristics of LEDs, notch dichroic mirrors and down-converting means.

As mentioned above, the LEDs of light sources 114 and 120 are preferably tuned to efficiently convert electricity to light. With presently available LEDs, maximum efficiency has been attained converting electricity to blue light. FIG. 5 helps explain "tuning" characteristics for the mentioned blue LEDs, notch dichroic mirrors 17 and 23 and down-converting and light-scattering means 130. In particular, FIG. shows preferred wavelength characteristics for the foregoing components.

In FIG. 5, exemplary LED Spectral Power Distribution extends from about 400 nm to about 520 nm, but more than 95 percent of its spectral range preferably falls within a range 180 extending from about 430 nm to about 485 nm. A preferred LED may be those sold by Cree, Inc. of Durham, N.C. USA, under Product Code XLamp XT-E Royal Blue LEDs. Beneficially, the illustrated, preferred Excitation Wavelength Range of Down-Converting Means includes the foregoing wavelength range 180. An exemplary Down-Converting Means comprises a phosphor sold by Intematix of Fremont, Calif., USA, under Product Code NYAG4653, by way of example. Accordingly, the blue light from the LEDs can be efficiently converted to another color spectrum, such as white, by the down-converting means.

Tuning of the notch dichroic mirrors 117 and 123 to efficiently pass blue light from the LEDs to the light pipe 112 is achieved where the illustrated Notch Mirror Transmission Profile is broad enough to efficiently pass more than 80 percent or more preferably 95 percent of blue light from the LEDs the light pipe 112.

For certain wavelengths of light, an alternative to a notch dichroic mirror is a dichroic mirror incorporating a cut-off filter. Thus, to illustrate the replacement of a notch dichroic mirror tuned to blue light with a dichroic mirror incorporating a cut-off filter, FIG. 5 shows alternative portion of the notch Dichroic Mirror Transmission Profile labeled 500 that would replace left-shown portion 502.

First Non-Symmetrical Embodiment

Figure 6:
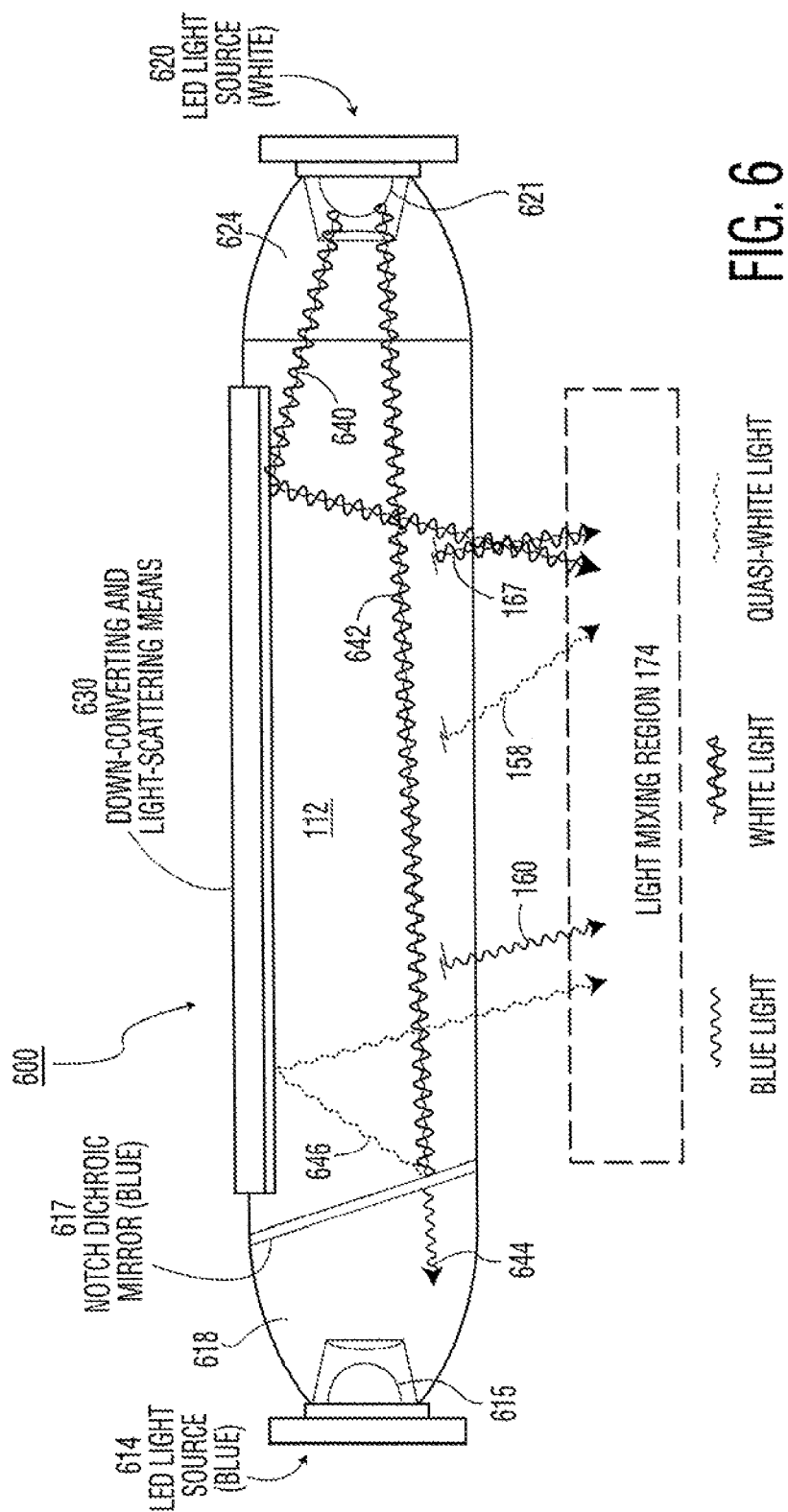
FIG. 6 is similar to FIG. 1, but shows an elongated lighting arrangement in accordance with another embodiment of the invention.

FIG. 6 shows an elongated lighting arrangement 600 whose ends are not symmetrical to each other. The left-shown end of arrangement 600 includes a LED light source 614, a notch dichroic mirror 617 and a light coupler 618 that correspond to the LED light source 114, notch dichroic mirror 117 and light coupler 118 of FIG. 1. However, the right-shown LED light source 620, preferably providing white light, differs from LED light source 120 of FIG. 1 that preferably provides blue light. Additionally, there is no notch dichroic mirror on the right-hand side of elongated lighting arrangement 600 to correspond with the notch dichroic mirror 123 of FIG. 1, and right-shown light coupler 624 in FIG. 6 consequently differs in shape from right-shown light coupler 624 in FIG. 1. Such light coupler 624 may be formed integrally or separately from the light pipe 112. Finally, the down-converting and light-scattering means 630 corresponds with the down-converting and light-scattering means 130 of FIG. 1.

In operation, the left-hand components of elongated lighting arrangement 600 of FIG. 6 operate in a similar manner to the left-hand components of elongated lighting arrangement 100 of FIG. 1. Therefore, only the parts of light rays 158 and 160 that extending into light mixing region 174 are shown in FIG. 6, and the reader is referred to the above description concerning the foregoing light rays.

FIG. 6 shows two exemplary white light rays 640 and 642 from LED light source 620. White light ray 640 is directed to the left and upwardly where it strikes down-converting and light-scattering means 630 at the top of light pipe 112 and is scattered downwardly into light mixing region 174. Segments of light rays 158, 160 and 167, which are fully shown in FIG. 1 and described in connection with FIG. 1, also enter light mixing region 174 so as to intermix with light ray 640. White light ray 642 travels straight through light pipe 112, and reaches notch dichroic mirror 617. The blue part 644 of white light ray 642 passes through notch dichroic mirror 617, tuned to blue light as is notch dichroic mirror 117 of FIG. 1, and typically is lost because it does not contribute to side-light extraction from elongated lighting arrangement 600. However, higher wavelength light 646, referred to as a "quasi-white" light ray 646, is saved and converted to useful light by being reflected from notch dichroic mirror 617, striking down-converting and light-scattering means 630, and being scattered downwardly into light mixing region 174.

Second Non-Symmetrical Embodiment

Figure 7:
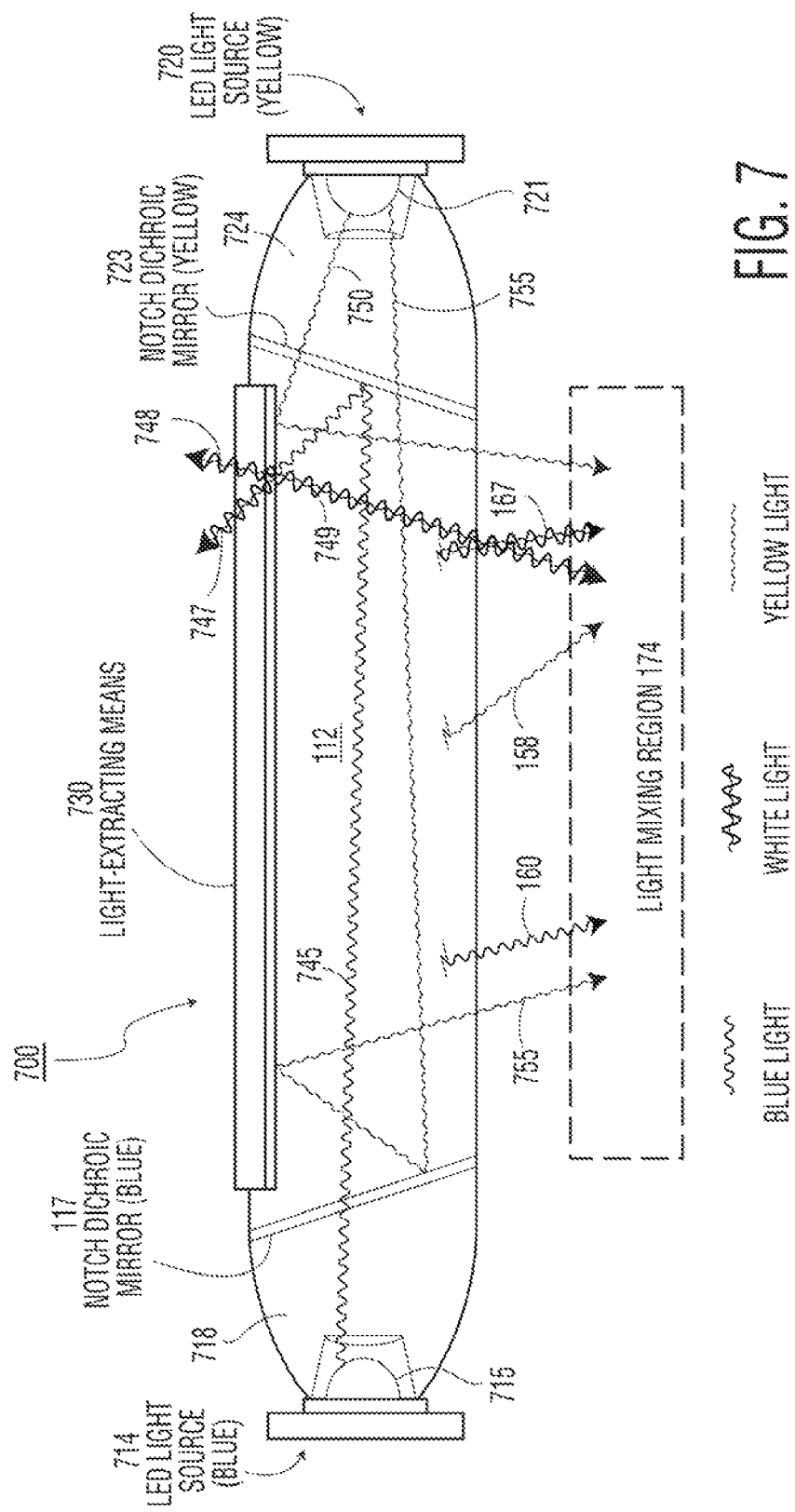
FIG. 7 is similar to FIG. 1, but shows an elongated lighting arrangement in accordance with a yet another embodiment of the invention.

FIG. 7 shows an elongated lighting arrangement 700 whose ends are not symmetrical with each other. The left-shown end of arrangement 700 includes an LED light source 714, a notch dichroic mirror 717 and a light coupler 718 that correspond to the LED light source 114, notch dichroic mirror 117 and light coupler 118 of FIG. 1. Light coupler 724, associated with LED light source 720, corresponds to light coupler 124 of FIG. 1. However, the right-shown LED light source 720, which may provide yellow light, differs from LED light source 120 of FIG. 1 that preferably provides blue light. Additionally, notch dichroic mirror 723 is tuned to pass yellow light, rather than blue light as is the case for notch dichroic mirror 117 of FIG. 1. Finally, elongated lighting arrangement 700 includes a light-extracting means 730, which may differ from the down-converting and light-scattering means 130 of FIG. 1, as follows.

"Light-extracting means," as applies to light-extracting means 730 of FIG. 7, connotes herein a means that can extract light by light scattering as described above, that is, without changing wavelength of scattered light, and optionally that can also extract light through a down-converting means as described above, wherein emitted light has a higher wavelength than absorbed light. Accordingly, there are two distinct modes of operation for elongated lighting arrangement 700 of FIG. 7.

In the first mode of operation for elongated lighting arrangement 700, light-extracting means 730 comprises light-scattering means as well as down-converting means, as these terms have been defined above. In this case, the light-extracting means 730 may be embodied, as shown in FIGS. 2 and 3, as down-converting and light-scattering means 132 or 134, or as shown in FIG. 4, as interspersed stripes of phosphor 136 and titania 138.

In the first mode of operation of lighting arrangement 700, LED light source 714 emits a blue light ray 745, which passes through notch dichroic mirror 717, tuned to pass blue light. Blue light ray 745 reaches notch dichroic mirror 723, and because such mirror 723 is tuned to yellow light, blue light ray 745 is beneficially reflected by the mirror upwardly, where it strikes light-extracting means 730, resulting in exemplary, alternative light rays 747, 748 and 749. Light rays 747, 748 and 749 are white light rays, due to absorption and reemission by down-converting means in light-extracting means 730. White light ray 749 is directed downwardly and enters light mixing region 174. Segments of light rays 158, 160 and 167, which are fully shown in FIG. 1 and described in connection with FIG. 1, also enter light mixing region 174 so as to intermix with white light ray 749.

As also shown in FIG. 7, in the first mode of operation for lighting arrangement 700, wherein light-extracting means 730 also includes a down-converting means, LED light source 720 produces an two exemplary yellow light rays 750 and 755. Yellow light ray 750 is directed so as to strike light-extracting means 730, whose down-converting means is tuned to blue light. Therefore, the light-extracting means 730 does not absorb the yellow light, but only scatters the yellow light ray 750 downwardly without changing its wavelength. Light ray 750 reaches light mixing region 174, so as to mix with other light rays in such region.

The other yellow light ray 755 emitted by LED light source 720 travels all the way across light pipe 112 and reaches notch dichroic mirror 717. Since mirror 717 is tuned to pass only blue light, yellow light ray 755 is beneficially reflected from the mirror, strikes light-extracting means 730, and is scattered downwardly to reach light mixing region 174.

Figure 8:
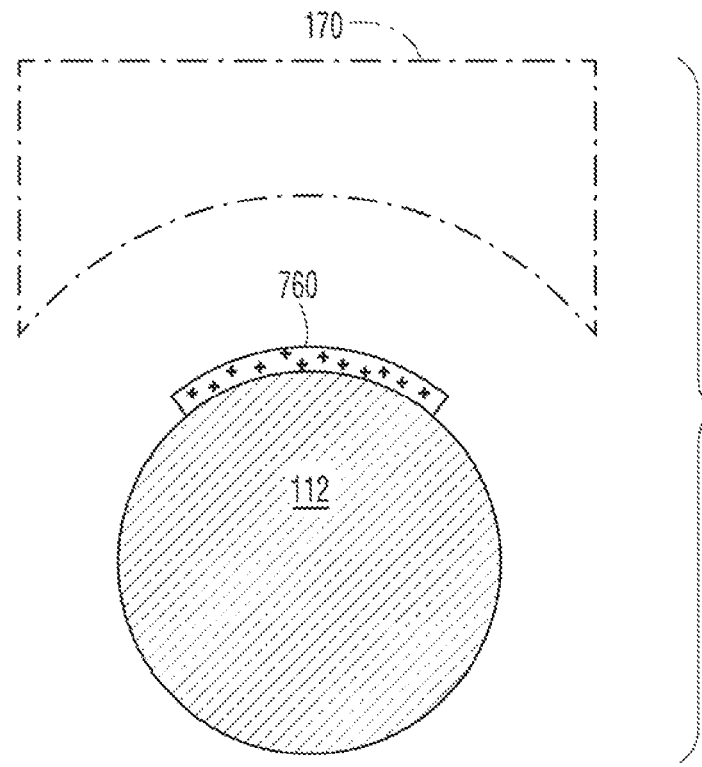
FIG. 8 is an enlarged, possible cross-section of the lighting arrangement of FIG. 7 taken midway along the left-to-right axis of the elongated lighting arrangement shown in FIG. 7.

In the second mode of operation of elongated lighting arrangement 700, light-extracting means 730 does not include a down-converting means, as defined above. Therefore, as shown in FIG. 8, the light-extracting means 730 may be comprised of titania 760 with a suitable binder, and not phosphor or other down-converting means, as illustrated in FIG. 8. In this second mode of operation, the quasi-white light ray 158 and white light ray 167 of FIG. 1 entering the light mixing region 174 would not be present and would not enter light mixing region 174. This is due to the lack of a down-converting means to absorb blue light and remit light at longer wavelengths that characterize light rays 158 and 167.

In the mentioned second mode of operation of lighting arrangement 700, the yellow light rays 750 and 755 from LED light source 720 behave the same as in the first mode of operation as described above. This is because the yellow light rays 750 and 755 do not interact with any down-converting means in the light-extracting means 730 of the first mode, which is tuned to blue light, and there are no down-converting means in the second mode.

In the mentioned second mode of operation, the behavior of blue light ray 745 from LED light source 714 will differ from behavior in the first mode of operation as follows. Blue light ray 745 from LED light source 714 passes through notch dichroic mirror 717, tuned to pass blue light, and is reflected from notch dichroic mirror 723, tuned to yellow light, in the same manner as described for the first mode of operation. However, since the light-extracting means 730 lacks down-converting means, when blue light ray 745 strikes light-extracting means 730, there are no absorptions and reemissions as white light rays 747 and 748. But, there is light-scattering of blue light ray 745 without change of wavelength, from light-extracting means 730 and into light mixing region 174.

The following discussion elaborates on two of the above-described components of the invention elongated LED lighting arrangement; that is, a light pipe and a light-scattering means.

Light Pipe

The light pipe preferably comprises an elongated member, which may be in the form of a solid or hollow rod. By "elongated" is meant being long in relation to width or diameter, for instance, where the "long" dimension can be both along a straight path or a curved path. At least one end of the light pipe receives light from an associated light coupler. The elongated member has an elongated sidewall and light-extracting means along at least part of the elongated sidewall for extracting light through the sidewall and distributing said light to a target area. At least that portion of the light pipe having light-extracting means is preferably solid, although there may exist in the pipe small voids caused by manufacturing processes, for instance, that have insubstantial impact on the side-light light extraction and distribution properties of the pipe.

A light pipe may comprise an acrylic polymer rod, or high-temperature glass or quartz for operation in a heated environment, or other optically clear material such as the core of a large core, flexible, plastic, fiberoptic light pipe.

A light pipe in the form of a rod typically has a cross section along a central path of light propagation through the light pipe that is more round than flat. In such case, or instance, the minimum cross-sectional dimension of the rod s preferably more than 50 percent of the maximum cross-sectional dimension of the rod. In a preferred embodiment, the cross-section of the rod is substantially circular. However, the light pipe is not limited to the form of a rod, and may, for instance, be in the form of a rectangular cross-sectioned slab, with exemplary cross-sectional dimensions of less than about 5 mm in thickness and more than about 25 mm in width. A further, exemplary configuration for a slab is to have a rectangular light-receiving surface of a first width and a rectangular light-transmitting output surface of a substantially larger width, where the height of the slab from light-receiving surface to light-transmitting surface is varied to capture light from an LED, for instance, and spread in out for transmission through the light-transmitting surface.

Preferably, a light pipe is rigid, by which is meant that at 20 degrees Celsius the pipe has a self-supporting shape such that the pipe returns to its original or approximately original (e.g., linear or curved) shape after being bent along a central path of light propagation through the pipe.

Light-Scattering Means

Light-scattering means, as that term is defined above to avoid changing wavelengths of light, may be of various types whose selection will be routine to those of ordinary skill in the art. For instance, three types of light-scattering means are disclosed in U.S. Pat. No. 7,163,326, entitled "Efficient Luminaire with Directional Side-Light Extraction," assigned to Energy Focus, Inc. of Solon, Ohio. In brief, these three types are (1) discontinuities on the surface of a light pipe, (2) a layer of paint on the surface of a light pipe, and (3) a vinyl sticker applied to the surface of a light pipe.

In more detail, (1) discontinuities on the surface of a light pipe may be formed, for instance, by creating a textured pattern on the light pipe surface by molding, by roughening the light pipe surface with chemical etchant, or by making one or more indentations in the side of the light pipe. Secondly, (2) the light-scattering means could comprise a layer of paint exhibiting Lambertian-scattering and having a binder with a refractive index about the same as, or greater than that of, the core. Suitable light-scattering particles are added to the paint, such as titanium dioxide or many other materials as will be apparent to those of ordinary skill in the art. Preferably, the paint is an organic solvent-based paint. Thirdly, (3) the light-scattering means could comprise vinyl sticker material in a desired shape applied to the surface of the light pipe. Appropriate vinyl stickers have been supplied by Avery Graphics, a division of Avery Dennison of Pasadena, Calif. The film is an adhesive white vinyl film of 0.146 mm thickness, typically used for backlit signs.

Generally, the light-scattering means may be continuous or intermittent or partially continuous and partially intermittent along the length of a light pipe, for instance. An intermittent pattern is shown in the above-mentioned U.S. Pat. No. 7,163,326 in FIG. 15A, for instance.

The following is a list of reference numerals and associated parts as used in this specification and drawings:

| Reference Numeral | Part |
|---|---|
| 100 | Elongated lighting arrangement |
| 112 | Light pipe |
| 114 | LED light source |
| 115 | Lens |
| 117 | Notch dichroic mirror |
| 118 | Light coupler |
| 120 | LED light source |
| 121 | Lens |
| 123 | Notch dichroic mirror |
| 124 | Light coupler |
| 130 | Down-converting and light-scattering means |
| 132 | Down-converting and light-scattering means |
| 134 | Down-converting and light-scattering means |
| 136 | Phosphor |
| 138 | Titania |
| 150 | Blue light ray |
| 152 | White light ray |
| 154 | White light ray |
| 156 | White light ray |
| 157 | Blue light ray |
| 158 | Quasi-white light ray |
| 160 | Blue light ray |
| 165 | Blue light ray |
| 167 | White light ray |
| 170 | Reflector |
| 174 | Light mixing region |
| 180 | Wavelength range |
| 500 | Alternative transmission profile portion |
| 502 | Left-shown portion |
| 600 | Elongated lighting arrangement |
| 614 | LED light source |
| 617 | Notch dichroic mirror |
| 618 | Light coupler |
| 620 | LED light source |
| 624 | Light coupler |
| 630 | Down-converting and light-scattering means |
| 640 | White light ray |
| 642 | White light ray |
| 644 | Blue part of white light ray |
| 646 | Quasi-white light ray |
| 700 | Elongated lighting arrangement |
| 714 | LED light source |
| 717 | Notch dichroic mirror |
| 718 | Light coupler |
| 720 | LED light source |
| 723 | Notch dichroic mirror |
| 724 | Light coupler |
| 730 | Light-extracting means |
| 745 | Blue light ray |
| 747 | White light ray |
| 748 | White light ray |
| 749 | White light ray |
| 750 | Yellow light ray |
| 755 | Yellow light ray |
| 760 | Titania |

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. An elongated LED lighting arrangement, comprising:
   a) an elongated light pipe extending between first and second ends; the light pipe having a sidewall between said ends facing outwardly of the light pipe; the light pipe comprising homogeneous optical material between said ends,
   b) a first LED light source comprising at least one LED tuned to efficiently provide to the light pipe, via said first end, light within a first wavelength band;
   c) a first dichroic mirror interposed between the first LED light source and said first end; the mirror tuned to pass more than 90 percent of light within said first wavelength band from said first LED light source into the light pipe via said first end;
   d) down-converting means on said sidewall tuned to efficiently absorb light rays from said first LED light source within a wavelength band that includes at least 80 percent of said first wavelength band and to emit lower-energy light rays outside of the light pipe at respectively higher wavelengths;
   e) light-extracting means on said sidewall for extracting from the light pipe some light rays within said first wavelength band without changing the wavelengths of the foregoing light;
   f) the down-converting means and the light-extracting means being arranged so that the light emitted by the down-converting means and the light extracted from the light pipe by the light-extracting means intermix to produce light, the majority of which has a composite color determined by the foregoing light emitted and the foregoing light extracted; and
   g) the first dichroic mirror receiving some light emitted by the down-converting means and reflecting back into the light pipe more than 80 percent of the light received by the mirror, so that the reflected light can be extracted from the side of the light pipe by the light-extracting means.

2. The lighting arrangement of claim 1, wherein the first dichroic mirror is angled in such a way as to increase the likelihood of rays striking the light-extracting means as the light transits from the foregoing mirror towards said first end.

3. The lighting arrangement of claim 1, wherein the down-converting means is formed of material that can extract light from the side of the light pipe without changing the wavelength of the light.

4. The lighting arrangement of claim 3, wherein the light-extracting means comprises a Lambertian light scatterer.

5. The lighting arrangement of claim 1, wherein said wavelength band defines blue light.

6. The lighting arrangement of claim 5, wherein the composite color is white with a color temperature between 2700 K and 4500 K.

7. The lighting arrangement of claim 1, wherein more than 30 percent of length of the light pipe along a main path of light propagation between said first and second ends has a cross sectional area whose maximum dimension and area are constant to within 95 percent.

8. The lighting arrangement of claim 1, wherein a non-imaging light coupler is interposed between the first LED light source and the first dichroic mirror; the coupler being configured to condition the angular distribution of light to promote total internal reflection of such light within the light pipe.

9. The lighting arrangement of claim 1, wherein:
   a) a second LED light source, comprising at least one LED tuned to provide light within a second wavelength band, provides light to the light pipe via said second end;
   b) a second dichroic mirror is interposed between the second LED light source and said second end; the mirror being tuned to pass more than 90 percent of light within said second wavelength band from said second LED light source into the light pipe.

10. The lighting arrangement of claim 9, wherein said first and second wavelength bands overlap each other more than 90 percent.

11. The lighting arrangement of claim 9, wherein the first and second wavelength bands overlap each other less than 10 percent.

12. The lighting arrangement of claim 11, wherein:
a) the first wavelength band is for blue light; and
b) the second wavelength band is for one or more of yellow, orange and red light.

13. The lighting arrangement of claim 12, wherein the second wavelength band is for yellow light.

14. The lighting arrangement of claim 12, wherein the light-extracting means comprises material that differs from material forming said down-converting means.

15. The lighting arrangement of claim 1, wherein:
a) a second LED light source, comprising at least one LED tuned to provide light within a second wavelength band, provides light to the light pipe via said second end;
b) the second LED light source providing to the light pipe via said second end light that has not passed through a dichroic mirror; and
c) the first and second wavelength bands overlap each other less than 10 percent.

16. The lighting arrangement of claim 15, wherein the first wavelength band is for blue light and the second wavelength band is for white light.

17. An elongated LED lighting arrangement, comprising:
a) an elongated light pipe extending between first and second ends; the light pipe having a sidewall between said ends facing outwardly of the light pipe; the light pipe comprising homogeneous optical material between said ends,
b) a first LED light source comprising at least one LED tuned to efficiently provide to the light pipe, via said first end, light within a first wavelength band;
c) a first dichroic mirror interposed between the first LED light source and said first end; the mirror tuned to pass more than 90 percent of light within said first wavelength band from said first LED light source into the light pipe via said first end;
d) a second LED light source comprising at least one LED tuned to efficiently provide to the light pipe, via said second end, light within a second wavelength band;
e) a second dichroic mirror interposed between the second LED light source and said second end; the mirror tuned to pass more than 90 percent of light within said second wavelength band from said second LED light source into the light pipe via said second end;
f) the first and second wavelength bands overlapping each other less than 10 percent; and
g) light-extracting means on said sidewall for extracting from the light pipe light within said first and second wavelength bands without changing the wavelengths of the foregoing light.

18. The elongated lighting arrangement of claim 17, wherein the light-extracting means is free from down-converting means that absorbs light at one wavelength and emits light at a higher wavelength.

19. The elongated lighting arrangement of claim 17, wherein the first wavelength band is for blue light and the second wavelength band is for white light.

* * * * *